United States Patent
Hight et al.

(10) Patent No.: US 6,571,732 B2
(45) Date of Patent: Jun. 3, 2003

(54) REFLECTIVE PARTICLE FEEDER

(75) Inventors: Susan S. Hight, Warsaw, IN (US); Lionel L. Kreger, Warsaw, IN (US)

(73) Assignee: CTB IP, Inc., Wilmington, DE (US)

( * ) Notice: Subject to any disclaimer, the term of this patent is extended or adjusted under 35 U.S.C. 154(b) by 0 days.

(21) Appl. No.: 09/818,002

(22) Filed: Mar. 27, 2001

(65) Prior Publication Data

US 2002/0139310 A1 Oct. 3, 2002

(51) Int. Cl.⁷ .............................................. A01K 61/02
(52) U.S. Cl. ........................................ 119/52.1; 119/53
(58) Field of Search ............................ 119/52.2, 57.1, 119/57.8, 53, 52.1; 43/42.26, 114; 106/23, 193; 428/36.4, 35.3

(56) References Cited

U.S. PATENT DOCUMENTS

| | | | |
|---|---|---|---|
| 1,243,689 A | * 10/1917 | Berry | 119/61 |
| 1,282,784 A | * 10/1918 | Enholm | 119/61 |
| 1,469,013 A | * 9/1923 | Jacobus | 119/52.1 |
| 1,759,131 A | * 5/1930 | Miller | 119/61 |
| 2,054,454 A | 9/1936 | Thies et al. | 106/23 |
| 2,712,190 A | 7/1955 | Sobel | 41/10 |
| 2,947,646 A | * 8/1960 | Devaney et al. | 106/1.19 |
| 3,367,060 A | 2/1968 | Abercrombie | 43/42.33 |
| 3,491,056 A | 1/1970 | Saunders et al. | 260/41 |
| 3,598,087 A | * 8/1971 | Ramser | 119/51.11 |
| 3,713,870 A | 1/1973 | Kaye | 117/71 R |
| 3,879,883 A | 4/1975 | Strader | 43/42.32 |
| 3,971,340 A | * 7/1976 | Allen | 119/53 |
| 4,513,688 A | * 4/1985 | Fassauer | 119/57.1 |
| 4,577,434 A | 3/1986 | Davis | 43/115 |
| 4,912,871 A | 4/1990 | Brady | 43/42.26 |
| 4,959,924 A | 10/1990 | Martin | 43/114 |
| 5,007,380 A | 4/1991 | Badia et al. | 119/53 |
| 5,010,851 A | 4/1991 | Gvaryahu et al. | 119/174 |
| 5,062,388 A | 11/1991 | Kilham | 119/52.2 |
| 5,408,780 A | 4/1995 | Chambers, Sr. | 43/42.53 |
| 5,435,268 A | 7/1995 | Liethen | 119/57.8 |
| 5,463,980 A | * 11/1995 | Rasmussen | 119/57.1 |
| 5,510,398 A | 4/1996 | Clark et al. | 523/171 |
| 5,517,944 A | 5/1996 | Bate et al. | 119/53 |
| 5,596,946 A | 1/1997 | Bryant et al. | 119/52.1 |
| 5,699,753 A | 12/1997 | Aldridge, III | 119/52.1 |
| 5,782,200 A | 7/1998 | Knowles et al. | 119/53 |
| 5,849,817 A | 12/1998 | Green et al. | 523/515 |
| 5,869,154 A | * 2/1999 | Benson | 428/323 |
| 6,314,909 B1 | * 11/2001 | Horwood | 119/51.02 |

* cited by examiner

Primary Examiner—Peter M. Poon
Assistant Examiner—Susan Piascik
(74) Attorney, Agent, or Firm—Trexler, Bushnell, Giangiorgi, Blackstone & Marr, Ltd.

(57) ABSTRACT

The present invention provides a novel feeder that is used to attract agricultural animals to the feeder to enhance the animals' feeding behavior by providing a non-reflective feeder that is integrally formed with a plurality of reflective particles that attract the attention of the animals. Once the animals notice the reflective particles, the animals are drawn toward the feeder, thus encouraging them to find and eat the food in the feeder.

19 Claims, 2 Drawing Sheets

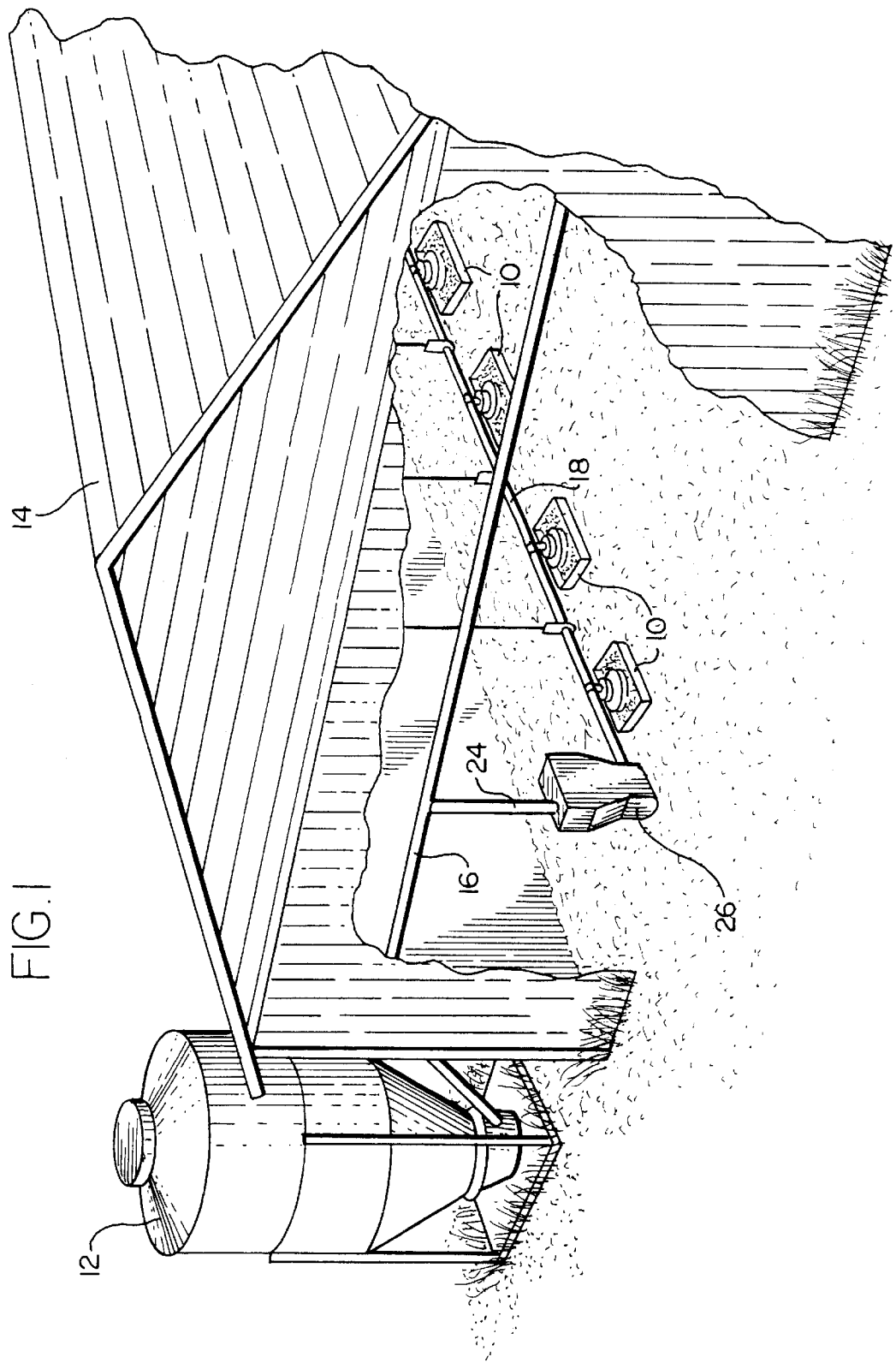

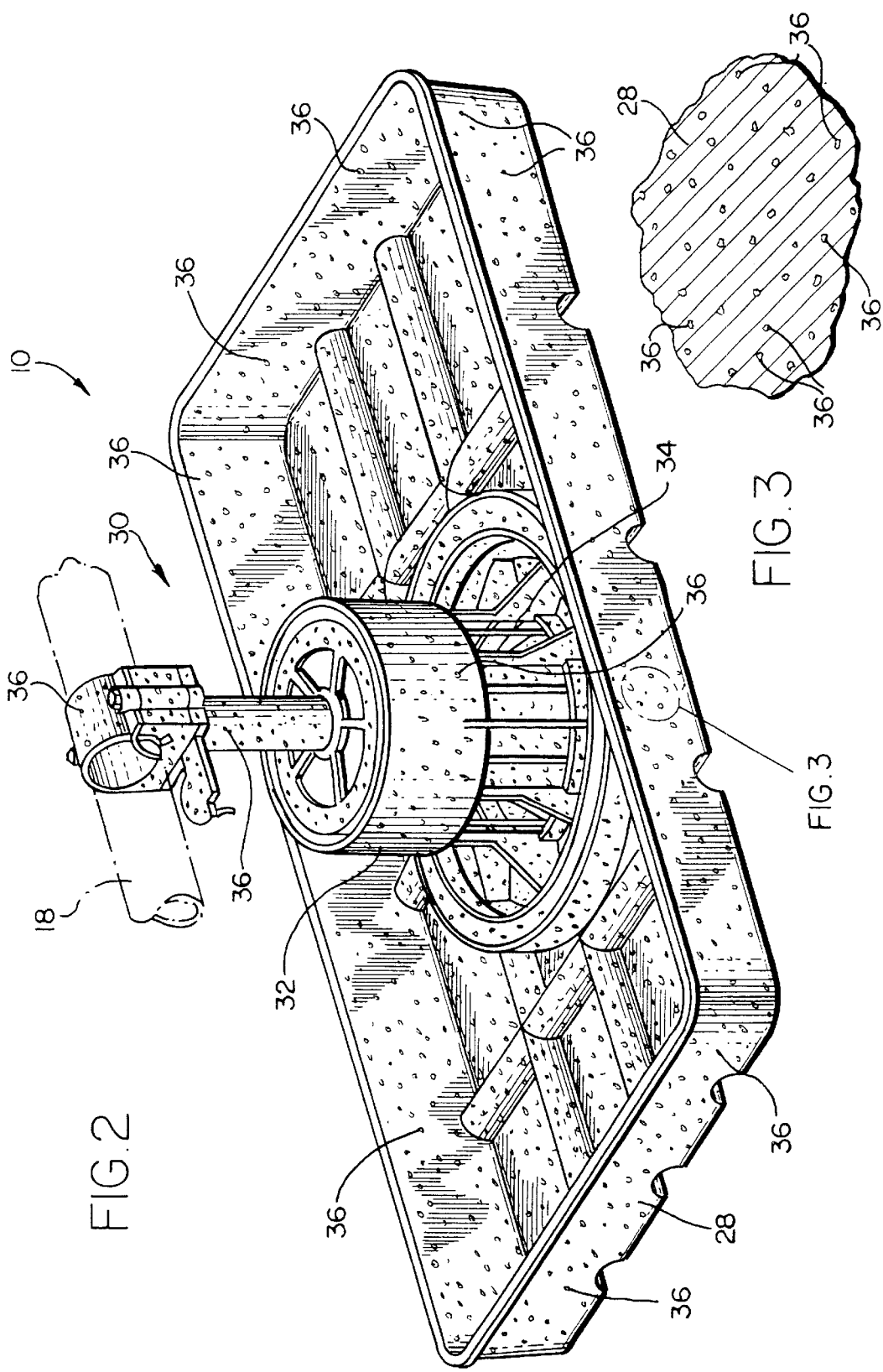

REFLECTIVE PARTICLE FEEDER

BACKGROUND OF THE INVENTION

The present invention relates to an improved feeder for agricultural animals, in particular, poultry. The feeder is provided with a plurality of reflective particles that are integral with the body of the feeder and which act to attract the poultry to the feeder, thus enhancing feeding behavior.

It has long been known that it is desirable for agricultural animals to eat plentifully so that they may stay healthy for their ultimate purpose, whether it be to reproduce or to be sold commercially. Problems have arisen, though, in that some agricultural animals do not eat enough food for their intended purpose. One reason for this problem is that the agricultural animals are not capable of detecting where their food is being set out for them and, thus, they cannot eat it if they cannot find it. It is for this purpose that those skilled in the art of the agricultural business have attempted to find ways to attract the agricultural animals to their feeding trays or bins.

One past method of attracting animals to their feeding trays or bins is by coloring the feeding tray or bin with a color that is attractive to that animal. For instance, it is relatively well known within the agricultural industry that adult turkeys and chickens are attracted to the color red and, therefore, many adult turkey and chicken feeding trays are now colored red in order to entice the adult turkeys and chickens to move towards the red feeding tray so that it is easier for the adult turkey and chickens to find their food. Likewise, it is also well known within the agricultural industry that young turkeys are attracted to a mossy green color and, therefore, most young turkey feeders are made of such a color.

Another known method of attracting animals to their feeding trays is by the use of sound. For instance, U.S. Pat. No. 5,517,944 to Bate et al. shows a poultry feeder that has audio conveying means to facilitate the feeding behavior of chicks. The audio conveying means plays sounds, such as maternal vocalizations, to attract the chicks to the feeder.

The present invention provides yet another innovative means of attracting animals to their feeding trays.

OBJECTS AND SUMMARY OF THE INVENTION

A primary object of the invention is to provide an agricultural feeder that will help attract agricultural animals to the feeder such that the animals' feeding behavior will be enhanced.

Another object of the invention is to provide a feeder which is light in weight, thereby decreasing strain on associated feed system and conveyor parts.

A further object of the invention is to provide a feeder that has the enhanced capability of attracting agricultural animals to it that does not dramatically increase the cost of making the feeders.

Another object of the invention is to provide a feeder that has the enhanced capability of attracting agricultural animals to it that does not make use of any additional mechanical or electrical parts.

Briefly, and in accordance with the foregoing, the present invention provides a novel feeder that is used to attract agricultural animals to the feeder to enhance the animals' feeding behavior. It is known that it is sometimes necessary to attract agricultural animals to a feeder for them to feed, as the animals sometimes are unable, without some assistance, to find the feeder on their own. Thus, the present invention provides a plastic non-reflective feeder that is integrally formed with a plurality of reflective particles that attract the attention of the animals. Once the animals notice the reflective particles, the animals are drawn toward the feeder, thus enabling them to find and eat the food in the feeder.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 1 is a perspective view showing a poultry house in which are installed several feeders having the novel feature of the present invention;

FIG. 2 is a perspective view showing in greater detail the feeder having the novel feature of the present invention; and FIG. 3 is an enlarged portion of a wall of the feeder as shown in FIG. 2.

DETAILED DESCRIPTION OF THE ILLUSTRATED EMBODIMENTS

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Turning first to FIG. 1, there are shown several feeders 10 having the feature of the present invention which are used in a typical feeding system. A feed storage bin 12 is located outside a poultry house 14, and a header conveyor 16 transports feed from the bin 12 to one or more cross or branch conveyors 18. These branch conveyors 18 typically include a conveyor tube and a helical auger member disposed therein for rotation within the conveyor tube by a motor in order to help move feed through the conveyor tube. Header drop tubes 24 and intermediate hoppers 26 or other devices insure the correct delivery of feed from the header conveyor 16 to the branch conveyor 18 (FIG. 1).

It should be noted that feeders of the present invention do not necessarily have to be connected to a system as shown in FIG. 1 and as described above, but rather that this is the preferred use of such feeders. It is envisioned that such feeders can be used in conjunction with any other type of feeding system or that such feeders do not need to be used in conjunction with any type of feeding system, i.e., similar to a dish that a domestic dog would eat out of where a human operator would merely fill the dish with the dog's food by hand.

It should also be noted that the type of feeder used is irrelevant to the novel aspects of the present invention. Many different feeders can be formed to have the novel aspects of the present invention. A small sample of the different types of feeders that the present invention can be used in conjunction with are U.S. Pat. No. 4,476,811 to Swartzendruber, U.S. Pat. No. 4,834,026 to Brembeck et al., U.S. Pat. No. 4,995,343 to Cole et al., U.S. Pat. No. 5,092,274 to Cole et al., and U.S. Design Pat. No. 426,682 to Kreger et al.

FIG. 2 shows a type of feeder 10 that the present invention can be used in conjunction with. Generally, feeder 10, and most other feeders, have a pan assembly 28 for retaining and presenting delivered feed. The feeder 10 can also have a drop tube assembly 30 adapted to extend from the conveyor 18 down into the pan 28. As can be envisioned from FIG. 2, feed delivered to the conveyor 18 falls down through the interior of the drop tube assembly 30 and into the pan assembly 28. The feeder 10 can further include a collar assembly 32 that surrounds the drop tube assembly 30, and that is held above the pan assembly 28 by grillwork 34. The grillwork 34 generally interconnects the collar assembly 32 and the pan assembly 28 so as to affix the collar assembly 32 at a predetermined location above the pan assembly 28.

The feeder 10 is preferably formed of a non-reflecting, lightweight, inert, tough material such as plastic. However, the feeder 10 can also be formed of any other type of material that is desired, and that may be necessary depending on the type of animal that will be feeding from the feeder.

The feeder 10 is also preferably formed of a certain color depending on the type of animal that will be feeding from the feeder. Different colors have been known to be attractive to different animals such that the animals are drawn to the color. For example, chickens and adult turkeys are known to be attracted to the color red and, thus, the feeder 10 is preferably formed with a reddish color when chickens or adult turkeys will be feeding from the feeder. Likewise, young turkeys are known to be attracted to a mossy green color and, thus, the feeder 10 is preferably formed with a mossy greenish color when young turkeys will be feeding from the feeder 10, as shown in FIG. 3.

The feeder 10 is also preferably integrally formed with a plurality of reflective particles 36. The particles 36 are visible from any viewpoint and are preferably disposed at random throughout the feeder 10, although, it is envisioned that patterns of particles could be formed if desired. The particles 36 allow reflection from lighting within the poultry house 14, or natural light, which is noticed by the agricultural animals. The animals will then be drawn or attracted to the reflecting particles 36 and, thus, the feeder 10. Because the animals are then attracted to the feeder 10, the animals will be able to find and eat their food. The reflective particles 36 are preferably metallic flecks or flakes, such as titanium or aluminum, or any other metallic or non-metallic material that will bond with the non-reflective material of the feeder 10.

While a preferred embodiment of the present invention is shown and described, it is envisioned that those skilled in the art may devise various modifications without departing from the spirit and scope of the foregoing description.

The invention is claimed as follows:

1. An agricultural feeder comprising:
    a body for receiving and dispersing feed, said body being formed of a non-reflecting material, said body of said feeder comprising a pan and a drop tube assembly operatively associated with said pan;
    a plurality of reflective visible particles integrally formed with said body, whereby said reflective visible particles function to attract agricultural animals to said feeder to facilitate feeding behavior.

2. An agricultural feeder as defined in claim 1, wherein said non-reflecting material of said body is plastic.

3. An agricultural feeder as defined in claim 2, wherein the color of said plastic is a shade of red.

4. An agricultural feeder as defined in claim 2, wherein the color of said plastic is a shade of green.

5. An agricultural feeder as defined in claim 1, wherein said agricultural animals are poultry, including chickens, turkeys and chicks.

6. An agricultural feeder as defined in claim 1, wherein said reflective visible particles are metallic flecks.

7. A poultry feeder comprising:
    a drop tube assembly formed of a non-reflecting material, said drop tube assembly capable of receiving feed from a conveying system operatively associated with a feed source;
    a pan assembly being operatively associated with said drop tube assembly, said drop tube assembly capable of dispersing feed to said pan assembly; and
    a plurality of reflective visible particles integrally formed with said drop tube assembly, whereby said reflective visible particles function to attract poultry to said poultry feeder to facilitate feeding behavior.

8. A poultry feeder as defined in claim 7, wherein said non-reflecting material of said drop tube assembly is plastic.

9. A poultry feeder as defined in claim 8, wherein the color of said plastic is a shade of red.

10. A poultry feeder as defined in claim 8, wherein the color of said plastic is a shade of green.

11. A poultry feeder as defined in claim 7, wherein said reflective visible particles are metallic flecks.

12. A poultry feeder comprising:
    a drop tube assembly capable of receiving feed from a conveying system operatively associated with a feed source;
    a pan assembly formed of a non-reflective material, said pan assembly being operatively associated with said drop tube assembly, said drop tube assembly capable of dispersing feed to said pan assembly; and
    a plurality of reflective visible particles integrally formed with said pan assembly, whereby said reflective visible particles function to attract poultry to said poultry feeder to facilitate feeding behavior.

13. A poultry feeder as defined in claim 12, wherein said non-reflecting material of said pan assembly is plastic.

14. A poultry feeder as defined in claim 13, wherein the color of said plastic is a shade of red.

15. A poultry feeder as defined in claim 13, wherein the color of said plastic is a shade of green.

16. A poultry feeder as defined in claim 12, wherein said reflective visible particles are metallic flecks.

17. An agricultural feeder comprising:
    a body for receiving and dispersing feed, said body being formed of a non-reflecting material; and
    a plurality of metallic reflective visible flecks integrally formed with said body, whereby said metallic reflective visible flecks function to attract agricultural animals to said feeder to facilitate feeding behavior.

18. A poultry feeder comprising:
    a drop tube assembly formed of a non-reflecting material, said drop tube assembly capable of receiving feed from a conveying system operatively associated with a feed source;
    a pan assembly being operatively associated with said drop tube assembly, said drop tube assembly capable of dispersing feed to said pan assembly; and a plurality of metallic reflective visible flecks integrally formed with said drop tube assembly, whereby said metallic reflective visible flecks function to attract poultry to said poultry feeder to facilitate feeding behavior.

19. A poultry feeder comprising:

a drop tube assembly capable of receiving feed from a conveying system operatively associated with a feed source;

a pan assembly formed of a non-reflective material, said pan assembly being operatively associated with said drop tube assembly, said drop tube assembly capable of dispersing feed to said pan assembly; and a plurality of metallic reflective visible flecks integrally formed with said pan assembly, whereby said metallic reflective visible flecks function to attract poultry to said poultry feeder to facilitate feeding behavior.

* * * * *